March 24, 1970     P. A. AVERY     3,502,027

FUEL CONTROL SYSTEM FOR GAS TURBINE ENGINES

Filed April 30, 1968

INVENTOR.
PAUL A. AVERY
BY Charles M. Hogan
Gary M. Gron
ATTORNEYS.

United States Patent Office 3,502,027
Patented Mar. 24, 1970

3,502,027
FUEL CONTROL SYSTEM FOR GAS TURBINE ENGINES
Paul A. Avery, Shelton, Conn., assignor to Avco Corporation, Stratford, Conn., a corporation of Delaware
Filed Apr. 30, 1968, Ser. No. 725,354
Int. Cl. F04b 49/08; G05d 7/00, 11/00
U.S. Cl. 103—42                               6 Claims

ABSTRACT OF THE DISCLOSURE

The disclosure illustrates a gas turbine engine, fuel control system which comprises a variable output, engine driven fuel pump controlled by a pump rate actuation system to produce a controlled flow of fuel to the engine. A valve assembly is interposed between the fuel pump and the engine to maintain the output pressure of the pump between predetermined minimum and maximum values. At the same time the valve provides a means to rapidly bypass the pump outlet to its inlet and terminate flow to the engine as during an emergency engine shutdown.

---

The present invention relates to fluid flow systems and more particularly to fuel control systems for use in gas turbine engines.

The evolution of the gas turbine engine to its present highly developed state has required the use of very accurate and reliable fuel control systems. These systems control the flow of fuel to the gas turbine engine to provide optimum performance of the engine within its structural limitations. While present fuel control systems are quite effective in supplying the correct amounts of fuel, they are exceedingly complicated. In addition, they are generally expensive to manufacture and maintain.

Accordingly, it is an object of the present invention to provide a highly simplified, effective and economical fuel control system for a gas turbine engine.

The above ends are achieved in the broader aspects of the present invention by a gas turbine engine fuel control system comprising a flow control means for delivering a supply of fuel at variable rates through a flow path to the engine. A flow control valve is interposed in the flow path downstream of the flow control means to receive fuel from it. The flow control valve comprises a housing having a first passageway formed therethrough for connecting the flow control means to the engine. A second passageway means extends from the first passageway means to a point upstream of the flow control means to provide a bypass flow path.

A first valve element is displaceable in the first passageway means and cooperates with a first and second passageway means to block flow therethrough in a first position. The valve element permits flow through said first passageway means in a second position and permits flow through the first and second passageway means in a third position. The first valve element is positioned in the first passageway means so that upstream fuel pressure urges the valve element towards said second and third positions. A means is provided for yieldably urging the first valve element to the first-mentioned position with a force sufficient to permit flow through the first passageway means when the valve is displaced to the second position in response to a minimum predetermined upstream pressure. Flow to said second passageway means is permitted when the first valve element is displaced to the third position in response to a predetermined maximum upstream pressure.

A second valve element is displaceable in the first passageway means and cooperates with the second passageway means to block flow to said second passageway means in a first position and in a second position to permit flow from the first passageway means to the second passageway means independently of the flow path permitted by the first valve element. A means is provided for selectively displacing the second valve element between its positions to bypass fuel from the first passageway means, thereby lowering the upstream pressure on the first valve element to permit the first valve element to be displaced to the first position and prevent flow to the engine.

The above and other related objects and features of the present invention will be apparent from a reading of the description of the disclosure shown in the accompanying drawings and the novelty thereof pointed out in the appended claims.

Figures 1, 2:
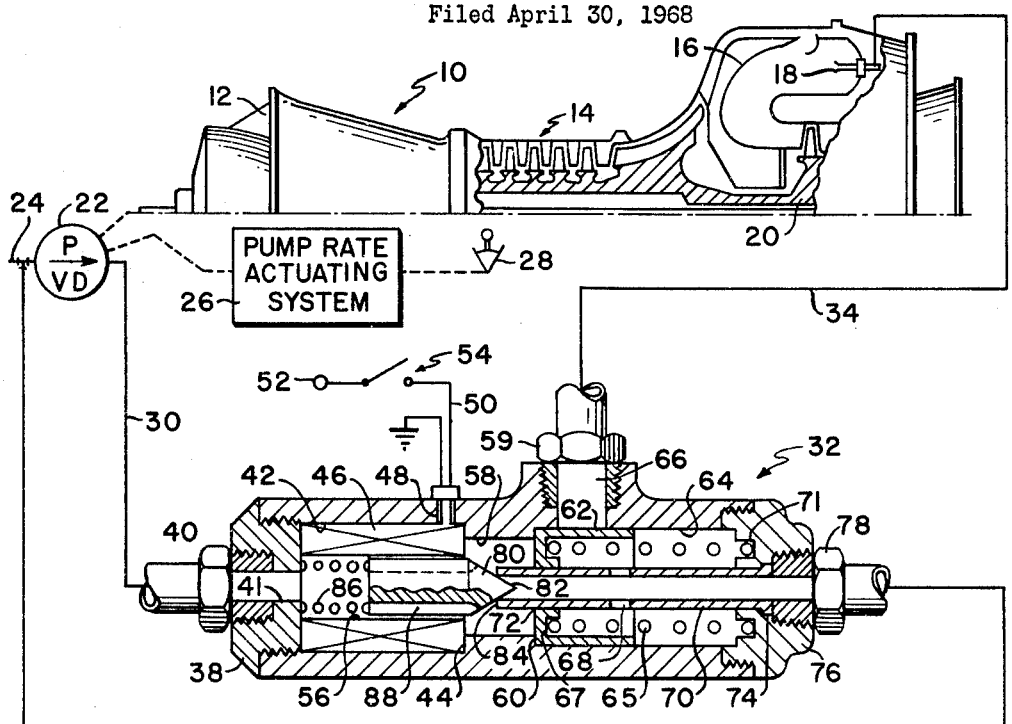
FIGURE 1 is a view of a flow control system embodying the present invention along with the cooperating elements of a gas turbine engine with which it is used.
FIGURE 2 illustrates a flow control valve of the fuel flow system of FIGURE 1 in various operating conditions.

Reference is now had to FIGURE 1 which illustrates a gas turbine engine 10 and a fuel control system embodying the present invention. The engine 10 has an inlet 12 for air which is pressurized by a rotating compressor assembly 14. The pressurized air is discharged from the compressor 14 to a combustor unit 16 where it is mixed with fuel injected by a nozzle (or nozzles) 18 and ignited by suitable means (not shown) to generate a propulsive gas stream. The propulsive gas stream is directed across a turbine 20, connected to the compressor 14, and then either to a power turbine for a rotatable output or to a nozzle for discharge to provide a propulsive thrust.

The fuel to the engine nozzle 18 is supplied by the fuel control system which comprises a variable output pump 22 driven through a suitable gear box (not shown) from the rotatable compressor 14. The pump 22 is any one of a number of well-known types of pumps which receive fuel from an inlet conduit 24 and provide a variable flow output in response to a control input from a pump rate actuating system, generally indicated by reference character 26. The pump rate actuating system provides a control input to the variable output pump 22 in response to operator demand from a power lever 28. The control input is modified by additional engine operating parameters, e.g., compressor discharge pressure turbine inlet temperature, compressor speed, etc. to enable optimum engine performance.

An example of a variable output pump that may be used for this purpose is what is known as a wobble plate pump. This pump comprises a rotating pivoted disk which sequentially reciprocates a series of circumferentially positioned pistons to positively displace a given amount of fuel through a suitable valve system. The degree to which the rotating disk is pivoted determines the flow output for a given rotational speed of the disk. In the present fuel control system the pivoting of the disk would be controlled by the pump rate actuation system 26. The system may be a hydromechanical or electrical control system adapted to provide a mechanical displacement output in response to the above control inputs to pivot the rotating disk and control the flow output of the pump 22.

The flow ouput of the pump 22 is discharged via a conduit 30 and downstream flow control valve 32 to a nozzle supply conduit 34. The conduit 34 is connected to the nozzles 18 for injection of fuel into the engine combustor 16. The flow control valve 32 comprises a generally cylindrical housing 36 having a threaded-in end cap 38 and a fitting 40 which secures the conduit 30 to the cap 38. The end cap 38 holds a solenoid 46 against a shoulder 44 of a bore 42 in the housing 36. A radial passageway 48 in the housing 36 enables output leads 50 of the solenoid 46 to be connected to an external power source 52 via a switch 54. A passageway 41 in the end cap and a passageway 56 through the interior of the solenoid 46 provide a flow path for fuel from the conduit 30 to an interior bore 58 of the housing 36.

The interior bore 58 terminates in a shoulder 60 at one end of a bore 64 which extends to a threaded-in end cap 76. A radial passageway 66 provides a flow path from the bore 64 to a fitting 59 that connects to the nozzle supply conduit 34. A tube 70 is centrally disposed in the bores 64 and 58 and has an open end 84 terminating a short distance from the end of passageway 56 through the solenoid 46. The opposite end of the tube 70 has a flange 74 held in a recess in the end cap 76 by a fitting 78. The fitting 78 connects with a conduit 79 extending to the supply conduit 24 for the pump 22 to form a bypass flow path for fuel from the pump 22.

A first valve element 62 is displaceable in the bore 64 and has an opening 72 telescoped over the tube 70. The piston valve element 62 is yieldably urged against the shoulder 60 to block flow to the outlet passage 66 by a spring 65. The spring 65 acts against an annular recess 67 on the downstream side of the piston element 62 and a recess 71 formed on the inner side of the end cap 76. The first valve element 62 is displaceable away from the shoulder 60 by upstream pressure to first permit flow through the outlet passageway 66 and upon further displacement additionally permit flow through radial ports 68 of the tube 70.

A second valve element 80 is displaceable in the passageway 56 of the solenoid and has a conical end portion 82 adapted to be displaced against the open inner end 84 of the tube 70.

A spring 86 acts on the end cap 38 and the upstream end of the valve element 80 to yieldably urge the valve element against the open end 84 of the tube 70. The valve element 80 is preferably comprised of ferrous material so that it may be displaced by the electromagnetic force of the solenoid 46. The polarity of the power source 52 is selected so that upon energization of the solenoid the valve element 80 is urged away from the open end of the tube 70 against the action of the spring 86. This permits a flow path from the output conduit 30 of the pump 22 through the tube 71 to the bypass conduit 79 independently of the flow path provided through the radial ports 68.

Before the gas turbine engine 10 is started, the fuel control system and particularly the flow control valve 32 is in the position illustrated in FIGURE 1. The engine is started by first rotating the compressor 14 to build up a supply of compressed air in the combustor 16. At the same time the fuel pump 22 is driven by the compressor rotor and the pump rate actuation system causes the pump to provide a maximum flow output to fill up the fuel system and establish a given start-up flow rate. As the system fills up, the upstream pressure on the piston valve element 62 builds up to a point where at a predetermined minimum level the valve 62 is displaced away from the shoulder 60 to uncover the outlet port 66, as shown in FIGURE 2. Thus when a predetermined minimum pressure generally set by the spring constant of the spring 65 is exceeded, flow to the nozzle supply conduit 34 is established to permit ignition and combustion in the combustor 16. As the engine 10 is operated in a normal fashion the piston valve element 62 acts to maintain a minimum back pressure against the pump 22. In many systems the minimum back pressure is required to provide proper operation of hydraulic control systems for the pump 22.

If the back pressure on the pump exceeds a level which could be harmful thereto, the displacement of the piston valve element 62, in response to this higher pressure, uncovers radial port 68, as shown in phantom in FIGURE 2, to provide a flow path from the upstream side of the piston valve element 62 directly to the bypass conduit 79 and to the inlet 24 of the pump 22. The valve element 62 will be maintained in this position to limit the maximum upstream pressure as long as the adverse condition exists. It should be noted that the axial position of the radial ports 68 on the tube 70 may be positioned to select a given maximum pressure limit for the system.

If combustion is terminated during normal engine operation, there is an immediate need to terminate flow through the nozzles 18 to prevent an unwanted accumulation of raw fuel because the engine compressor which drives the fuel pump normally windmills if the engine is in flight. To prevent this condition the switch 54 is closed either by an operator or by an automatic system to energize the solenoid 46 and displace the valve element 80 away from the opened end of the tube 70, as shown in phantom in FIGURE 2. When this happens a bypass flow path from the inlet of the valve element 32 to the tube 70 is established independently of any path provided by the piston valve element 62. Because there is a rapid flow of fuel from the valve inlet to the tube 70, the pressure on the upstream face of the valve element 62 is reduced to the point where the spring urges the valve element 62 against the shoulder 60 to positively block further flow to the nozzle supply conduit 34. The solenoid 46 is then kept energized to provide a windmill bypass of the fuel until combustion is again initiated. When combustion is established the solenoid 46 is deenergized, thus permitting the valve element 80 to be urged by the spring 86 and the upstream fluid pressures against the open end 84 of the tube 70. This terminates the bypass flow and permits normal functioning of the fuel control system.

It should be noted that the solenoid 46 may be energized during a normal engine shutdown to prevent further flow to the combustor 16 when the inertia of the compressor rotor keeps it moving after combustion has terminated. In this case the flow that would be scheduled from the pump 22 would be bypassed to its inlet to prevent build-up of fuel in the combustor 16. The solenoid may be de-energized just before the compressor 14 has stopped to enable a moderate build-up of pressure in the pump outlet conduit 30 to insure that the fuel lines 30 will be full until the next engine start-up.

The fuel control system described above is highly useful with many types of gas turbine engines. The invention is not limited to the use of the flow control valve 32 with a variable output pump of the wobble plate type but includes the flow control valve 32 with any type of a fuel flow control means with equal usefulness. Many other modifications of the present invention will occur to those skilled in the art and, accordingly, the scope and spirit of the present invention is to be determined solely by the appended claims.

Having thus described the invention, what is claimed as novel and desired to be secured by Letters Patent of the United States is:

1. A fuel control system for a gas turbine engine, said system comprising:
    flow control means for delivering a supply of fuel at variable rates along a flow path to said engine;
    a flow control valve interposed in said flow path downstream of and receiving fuel from said flow control means, said flow control valve comprising:
        a housing;
        a first passageway means formed through said housing for connecting said flow control means to said engine;
        a second passageway means for providing a bypass flow path from said first passageway means to a point upstream of said flow control means;
        a first valve element displaceable in said first passageway means and cooperating with said first and second passageway means to block flow therethrough in a first position and permit flow through said first passageway means in a second position and permit flow through said first and second passageway means in a third position, said first valve element being positioned in said first passageway means so that upstream fuel pressure urges said valve element towards said second and third positions;

means for yieldably urging said first valve element toward said first-mentioned position with a force sufficient to permit flow through said first passageway means when said valve is displaced to said second position in response to a minimum predetermined upstream pressure and to permit flow to said second passageway means when said valve is displaced to said third position in response to a predetermined maximum upstream pressure;

a second valve element displaceable in said first passageway means and cooperating with said second passageway means to block flow to said second pasageway means in a first position and in a second position to permit flow from said first passageway means to said second passageway means independently of the flow path permitted by said first valve element; and means for selectively displacing said second valve element between said positions to bypass fuel from said first passageway means, thereby lowering the upstream pressure on said first valve element to permit said first valve element to be displaced to said first position and prevent flow to said engine.

2. A fluid flow system as in claim 1 wherein said second valve element is comprised of ferrous material and wherein said means for selectively displacing said second valve element between said positions comprises:

means for yieldably urging said second valve element to said first position; and means for generating an electromagnetic field to urge said second valve element into said second position.

3. A fluid flow system as in claim 1 wherein:

said second passageway means comprises an elongated tubular element extending into said first passageway means and having an end opening into said passageway, said tube being positioned so that said second valve element is selectively displaceable against and away from the end of said tube;

said first valve element has a generally central opening therein and is positioned so that said first valve element telescopes over said tubular element;

said tubular element has a plurality of radial ports axially positioned from the open end of said tubular member so that said first valve element is displaceable in response to said higher predetermined pressure to permit flow from said first passageway to said second passageway.

4. A flow control system as in claim 3 wherein said flow control means comprises:

a variable output pump;

means for controlling the output of said pump in response to operator demand.

5. A fluid flow system as in claim 4 wherein said second valve element is comprised of ferrous material and wherein said means for selectively displacing said second valve element between said positions comprises:

means for yieldably urging said second valve element to said first position; and a solenoid for generating an electromagnetic field to urge said second valve element into said second position in response to exterior energizationo f said solenoid.

6. A fluid flow system as in claim 5 wherein:

said solenoid surrounds the inlet portion of said first passageway and has an interior passageway forming in part the flow path through said first passageway, the downstream end of said solenoid being axially spaced from the open end of said tube;

the upstream end of said second valve element is telescoped into the interior passageway of said coil; and said second valve element further comprises means for providing a passageway from the upstream end of said second valve element to the space between the downstream end of said coil and the open end of said tubular element thereby permitting flow from the upstream end of said first passageway to the upstream side of said second valve element.

References Cited

UNITED STATES PATENTS

| | | | |
|---|---|---|---|
| 2,145,533 | 1/1939 | Starr | 103—40 |
| 2,193,504 | 3/1940 | Antrim et al. | 103—42 |
| 2,479,359 | 8/1949 | Holt | 137—108 |
| 2,700,397 | 1/1955 | Compton | 103—41 X |
| 2,761,387 | 9/1956 | Gaubatz | 103—41 X |
| 2,919,162 | 12/1959 | Roberts | 137—115 |
| 3,339,574 | 9/1967 | Erb et al. | 137—115 |
| 3,427,981 | 2/1969 | Jansson | 103—41 |

WILLIAM L. FREEH, Primary Examiner

U.S. Cl. X.R.

137—25, 108, 115